(12) United States Patent
Benchenaa et al.

(10) Patent No.: US 12,299,254 B2
(45) Date of Patent: *May 13, 2025

(54) GENERATING AND DISPLAYING SUPPLEMENTAL INFORMATION AND USER INTERACTIONS ON INTERFACE TILES OF A USER INTERFACE

(71) Applicant: Intel Corporation, Santa Clara, CA (US)

(72) Inventors: Hayat Benchenaa, London (GB); Daren P. Wilson, London (GB); Aras Bilgen, Hillsboro, OR (US); Dirk Hohndel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,515

(22) Filed: Jan. 27, 2023

(65) Prior Publication Data

US 2023/0251758 A1 Aug. 10, 2023

Related U.S. Application Data

(63) Continuation of application No. 15/601,480, filed on May 22, 2017, now Pat. No. 11,609,677, which is a
(Continued)

(51) Int. Cl.
*G06F 3/0482* (2013.01)
*G06F 3/0481* (2022.01)
(Continued)

(52) U.S. Cl.
CPC .......... *G06F 3/0482* (2013.01); *G06F 3/0481* (2013.01); *G06F 3/04817* (2013.01);
(Continued)

(58) Field of Classification Search
None
See application file for complete search history.

(56) References Cited

U.S. PATENT DOCUMENTS

| 5,664,133 A | 9/1997 | Malamud |
| 6,826,729 B1 * | 11/2004 | Giesen .................. G06F 3/0481 715/810 |

(Continued)

FOREIGN PATENT DOCUMENTS

| CN | 101950236 A | 1/2011 |
| CN | 102355529 A | 2/2012 |

(Continued)

OTHER PUBLICATIONS

International Searching Authority, "International Search Report," issued in connection with International Patent Application No. PCT/US2013/077555, mailed on Apr. 9, 2014, 3 Pages.
(Continued)

*Primary Examiner* — Tuyetlien T Tran
(74) *Attorney, Agent, or Firm* — Hanley, Flight & Zimmerman, LLC

(57) ABSTRACT

Technologies for displaying supplemental interface tiles on a user interface of a computing device include determining supplemental information and/or available user interactions associated with a user interface tile displayed on the user interface. A supplemental interface tile is displayed in association with the user interface tile in response to a user selecting the user interface tile. The supplemental information and/or an interaction widget corresponding to the available user interactions may be displayed on the supplemental interface tile based on the selection gesture used by the user to select the user interface tile.

20 Claims, 4 Drawing Sheets

Related U.S. Application Data continuation of application No. 13/729,354, filed on Dec. 28, 2012, now Pat. No. 9,658,742.

(51) Int. Cl.
| | |
|---|---|
| *G06F 3/04817* | (2022.01) |
| *G06F 3/04886* | (2022.01) |
| *H04M 1/7243* | (2021.01) |
| *G06F 3/04842* | (2022.01) |
| *H04M 1/57* | (2006.01) |
| *H04M 1/72469* | (2021.01) |

(52) U.S. Cl.
CPC ...... *G06F 3/04886* (2013.01); *H04M 1/7243* (2021.01); *G06F 3/04842* (2013.01); *H04M 1/576* (2013.01); *H04M 1/72469* (2021.01)

(56) References Cited

U.S. PATENT DOCUMENTS

| | | | |
|---|---|---|---|
| 7,581,194 B2 | 8/2009 | Iwema | |
| 7,934,156 B2 | 4/2011 | Forstall et al. | |
| 9,229,918 B2* | 1/2016 | Zaman | G06F 3/0488 |
| 9,658,742 B2 | 5/2017 | Benchenaa | |
| 11,609,677 B2 | 3/2023 | Benchenaa et al. | |
| 2005/0044058 A1* | 2/2005 | Matthews | G06F 9/4418 |
| 2005/0108655 A1 | 5/2005 | Andrea | |
| 2006/0200780 A1 | 9/2006 | Iwema | |
| 2007/0082707 A1* | 4/2007 | Flynt | G06Q 30/0261 |
| | | | 455/564 |
| 2008/0094371 A1* | 4/2008 | Forstall | G06F 3/04883 |
| | | | 715/810 |
| 2009/0132942 A1 | 5/2009 | Santoro | |
| 2009/0178007 A1 | 7/2009 | Matas | |
| 2009/0187824 A1 | 7/2009 | Hinckley | |
| 2009/0278806 A1* | 11/2009 | Duarte | G06F 3/03547 |
| | | | 345/173 |
| 2010/0085318 A1* | 4/2010 | Lee | G06F 3/0482 |
| | | | 345/173 |
| 2010/0146384 A1* | 6/2010 | Peev | G06F 9/451 |
| | | | 715/255 |
| 2010/0293056 A1* | 11/2010 | Flynt | G06F 3/0481 |
| | | | 705/14.58 |
| 2011/0115817 A1* | 5/2011 | Chun | G06F 3/04886 |
| | | | 715/764 |
| 2011/0173260 A1* | 7/2011 | Biehl | G06Q 10/06 |
| | | | 709/224 |
| 2011/0202878 A1* | 8/2011 | Park | G06F 3/04883 |
| | | | 715/825 |
| 2011/0219332 A1* | 9/2011 | Park | G06F 3/04883 |
| | | | 715/810 |
| 2012/0083260 A1* | 4/2012 | Arriola | G06F 16/252 |
| | | | 455/418 |
| 2012/0124498 A1 | 5/2012 | Santoro | |
| 2012/0167008 A1* | 6/2012 | Zaman | G06F 3/04817 |
| | | | 715/814 |
| 2012/0173339 A1 | 7/2012 | Flynt et al. | |
| 2012/0204191 A1* | 8/2012 | Shia | G06F 9/542 |
| | | | 719/318 |
| 2012/0266100 A1* | 10/2012 | Caliendo, Jr. | G06F 3/04883 |
| | | | 715/764 |
| 2012/0293421 A1 | 11/2012 | Santoro | |
| 2012/0297348 A1 | 11/2012 | Santoro | |
| 2013/0055162 A1* | 2/2013 | Arriola | G06F 16/44 |
| | | | 715/811 |
| 2013/0067421 A1* | 3/2013 | Osman | G06F 3/0481 |
| | | | 715/863 |
| 2013/0086522 A1* | 4/2013 | Shimazu | G06F 3/04817 |
| | | | 715/810 |
| 2013/0100036 A1* | 4/2013 | Papakipos | G06F 3/0485 |
| | | | 345/173 |
| 2013/0155116 A1* | 6/2013 | Paretti | G09G 5/14 |
| | | | 345/619 |
| 2013/0159900 A1* | 6/2013 | Pendharkar | G09G 5/14 |
| | | | 715/765 |
| 2013/0211938 A1* | 8/2013 | Allaqaband | G06Q 20/12 |
| | | | 705/21 |
| 2013/0227454 A1* | 8/2013 | Thorsander | G06F 40/166 |
| | | | 715/767 |
| 2013/0227470 A1* | 8/2013 | Thorsander | G06F 3/0482 |
| | | | 715/790 |
| 2013/0227476 A1* | 8/2013 | Frey | G06F 3/0482 |
| | | | 715/810 |
| 2013/0227482 A1* | 8/2013 | Thorsander | G06F 3/04886 |
| | | | 715/810 |
| 2013/0227490 A1* | 8/2013 | Thorsander | G06F 3/04883 |
| | | | 715/841 |
| 2013/0337873 A1 | 12/2013 | Yang | |
| 2014/0047331 A1* | 2/2014 | Feldman | G06F 40/106 |
| | | | 709/217 |
| 2014/0089143 A1* | 3/2014 | Dione | G06K 19/0723 |
| | | | 705/26.61 |
| 2014/0173457 A1* | 6/2014 | Wang | G06F 3/04845 |
| | | | 715/752 |
| 2014/0189592 A1 | 7/2014 | Benchenaa | |
| 2018/0101282 A1* | 4/2018 | Benchenaa | G06F 3/04817 |

FOREIGN PATENT DOCUMENTS

| | | |
|---|---|---|
| CN | 102541434 A | 7/2012 |
| CN | 102566922 A | 7/2012 |
| CN | 102681828 A | 9/2012 |
| CN | 104798024 A | 7/2015 |
| EP | 2939094 B1 | 6/2019 |
| JP | 2007511851 A | 5/2007 |
| WO | 2012088485 A2 | 6/2012 |
| WO | 2014105850 A1 | 7/2014 |

OTHER PUBLICATIONS

International Searching Authority, "Written Opinion," issued in connection with International Patent Application No. PCT/US2013/077555, mailed on Apr. 9, 2014, 8 Pages.

United States Patent and Trademark Office, "Non-Final Office Action," issued in connection with U.S. Appl. No. 13/729,354, dated Dec. 18, 2014, 29 pages.

United States Patent and Trademark Office, "Non-Final Office Action," issued in connection with U.S. Appl. No. 13/729,354, dated Jun. 30, 2015, 13 pages.

International Searching Authority, "International Preliminary Report on Patentability," issued in connection with International Patent Application No. PCT/US2013/077555, issued on Jun. 30, 2015, 10 pages.

United States Patent and Trademark Office, "Final Office Action," issued in connection with U.S. Appl. No. 13/729,354, dated Aug. 26, 2015, 15 pages.

United States Patent and Trademark Office, "Advisory Action," issued in connection with U.S. Appl. No. 13/729,354, dated Dec. 9, 2015, 3 pages.

United States Patent and Trademark Office, "Non-Final Office Action," issued in connection with U.S. Appl. No. 13/729,354, dated Jul. 29, 2016, 14 pages.

European Patent Office, "Extended European Search Report," issued in connection with European Patent Application No. 13869430.2, dated Sep. 28, 2016, 8 pages.

United States Patent and Trademark Office, "Notice of Allowance and Fee(s) Due," issued in connection with U.S. Appl. No. 13/729,354, dated Jan. 19, 2017, 11 pages.

China National Intellectual Property Administration, "The Third Office Action," issued in connection with Chinese Patent Application No. 201380062221.5, dated Apr. 16, 2018, 15 pages. [English Translation Included].

China National Intellectual Property Administration, "First Office Action," issued in connection with Chinese Patent Application No. 201380062221.5, dated Mar. 31, 2017, 21 pages.

China National Intellectual Property Administration, "The Second Office Action," issued in connection with Chinese Patent Application No. 201380062221.5, dated Nov. 6, 2017, 17 pages.

(56) References Cited

OTHER PUBLICATIONS

European Patent Office, "Communication Pursuant to Article 94(3) EPC," issued in connection with European Patent Application No. 13869430.2, dated Jul. 26, 2018, 5 pages.
China National Intellectual Property Administration, "Notice to Grant," issued in connection with Chinese Patent Application No. 201380062221.5, dated Dec. 12, 2018, 3 pages. [English Translation Included].
European Patent Office, "Communication Under Rule 71(3) EPC," issued in connection with European Patent Application No. 13869430.2-1972, dated Jan. 25, 2019, 5 pages.
European Patent Office, "Decision to Grant a Patent Pursuant to Article 97(1) EPC," issued in connection with European Patent Application No. 13869430.2-1216, dated May 9, 2019, 2 pages.
United States Patent and Trademark Office, "Non-Final Office Action," issued in connection with U.S. Appl. No. 15/601,480, dated Jun. 12, 2019, 13 pages.
United States Patent and Trademark Office, "Final Office Action," issued in connection with U.S. Appl. No. 15/601,480, dated Dec. 19, 2019, 12 pages.
United States Patent and Trademark Office, "Advisory Action," issued in connection with U.S. Appl. No. 15/601,480, dated Feb. 28, 2020, 3 pages.
United States Patent and Trademark Office, "Advisory Action," issued in connection with U.S. Appl. No. 15/601,480, dated Mar. 23, 2020, 3 pages.
United States Patent and Trademark Office, "Non-Final Office Action," issued in connection with U.S. Appl. No. 15/601,480, dated Aug. 14, 2020, 10 pages.
United States Patent and Trademark Office, "Final Office Action," issued in connection with U.S. Appl. No. 15/601,480, mailed on Dec. 28, 2020, 13 pages.
United States Patent and Trademark Office, "Advisory Action," issued in connection with U.S. Appl. No. 15/601,480, mailed on Mar. 11, 2021, 3 pages.
United States Patent and Trademark Office, "Non-Final Office Action," issued in connection with U.S. Appl. No. 15/601,480, mailed on Aug. 3, 2021, 11 pages.
China National Intellectual Property Administration, "The First Office Action," issued in connection with Chinese Patent Application No. 201910145711.0, dated Nov. 24, 2021, 11 pages.
United States Patent and Trademark Office, "Final Office Action," issued in connection with U.S. Appl. No. 15/601,480, dated Jan. 13, 2022, 16 pages.
United States Patent and Trademark Office, "Advisory Action," issued in connection with U.S. Appl. No. 15/601,480, mailed on Mar. 29, 2022, 3 pages.
United States Patent and Trademark Office, "Notice of Allowance and Fee(s) Due," issued in connection with U.S. Appl. No. 15/601,480, dated Nov. 2, 2022, 9 pages.
China National Intellectual Property Administration, "The Second Office Action," issued in connection with Chinese Patent Application No. 201910145711.0, dated May 13, 2022, 27 pages.
China National Intellectual Property Administration, "Notice to Grant," issued in connection with Chinese Patent Application No. 201910145711.0, dated Aug. 9, 2022, 3 pages.
China National Intellectual Property Administration, "First Search," issued in connection with Chinese Patent Application No. 201910145711.0, dated May 8, 2022, 2 pages.

* cited by examiner

GENERATING AND DISPLAYING SUPPLEMENTAL INFORMATION AND USER INTERACTIONS ON INTERFACE TILES OF A USER INTERFACE

CROSS-REFERENCE TO RELATED APPLICATIONS

This application is a continuation of U.S. application Ser. No. 15/601,480, entitled "GENERATING AND DISPLAYING SUPPLEMENTAL INFORMATION AND USER INTERACTIONS ON INTERFACE TILES OF A USER INTERFACE," which was filed on May 22, 2017, which claims the benefit from U.S. application Ser. No. 13/729,354, entitled "GENERATING AND DISPLAYING SUPPLEMENTAL INFORMATION AND USER INTERACTIONS ON INTERFACE TILES OF A USER INTERFACE," which was filed on Dec. 28, 2012, now U.S. Pat. No. 9,658,742, issued May 23, 2017, each of which if hereby incorporated herein by reference in their entireties.

BACKGROUND

Mobile computing devices are becoming ubiquitous tools for personal, business, and social uses. The portability of mobile computing devices is increasing as the size of the devices decrease and processing power increases. In fact, many computing devices are sized to be hand-held by the user to improve ease of use. Additionally, modern mobile computing devices are equipped with increased processing power and data storage capability to allow such devices to perform advanced processing. Further, many modern mobile computing devices are capable of connecting to various data networks, including the Internet, to retrieve and receive data communications over such networks. As such, modern mobile computing devices are powerful, often personal, tools untethered to a particular location.

As the processing power of mobile computing devices increases, many mobile computing devices are capable of contemporaneously running multiple applications and other background processes, such as notification processes. A user, however, typically can only interact directly with a single application or notification at one time, which may utilize the entire viewing display of the mobile computing device during such interaction. As such, other applications and/or background processes may use simplistic icon notifications to alert the user that additional information relating to the application or notification of the associated icon is available. For example, a badge, number, or other indicator may be overlaid on the associated application or notification icon to indicate to the user that additional information regarding the application/notification is available (e.g., the number of unread emails may be overlaid on the e-mail application icon, the number of software updates may be overlaid on an application icon, etc.). Such indicators only provide a notification of additional information but do not provide any portion of the additional information itself. Rather, to access the additional information, the user is often required to exit the application the user is currently using and select the application/notification icon having overlaid the indicator(s) to fully open the associated application/notification. Additionally, such simplistic indicators provide no additional interaction options with the underlying application/notification thereby further requiring the user to open fully the underlying application/notification to perform any interaction therewith.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
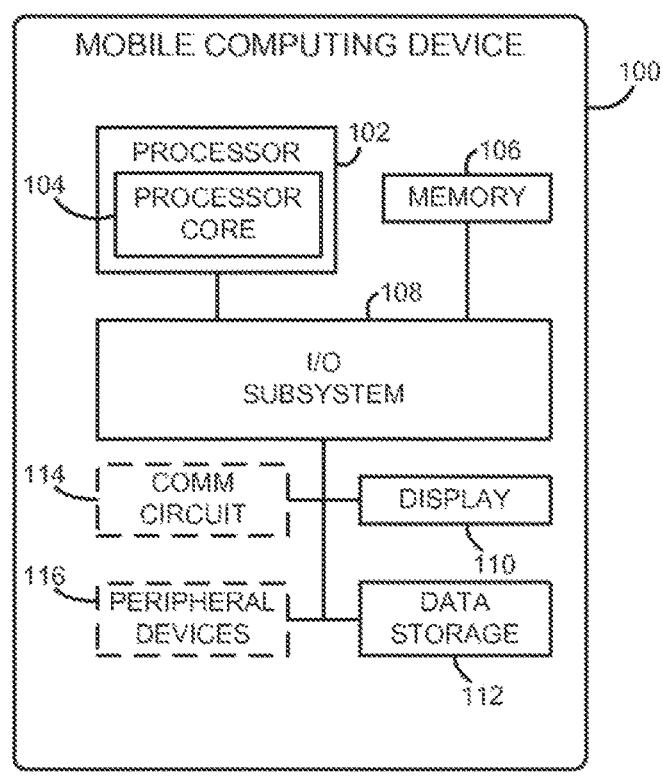
FIG. 1 is a simplified block diagram of at least one embodiment of a mobile computing device for displaying supplemental interface tiles on a user interface.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a mobile computing device 100 is configured to display a supplemental interface tile(s) associated with a user interface tile displayed on a user interface of the mobile computing device 100 in response to selection of the user interface tile by a user. The supplemental interface tile may present supplemental information and/or available user interactions associated with the selected interface tile (i.e., with the application or notification associated with the user interface tile). As discussed in more detail below, the particular supplemental information and/or available user interactions displayed on the supplemental interface tile may depend on one or more criteria such as the particular user interface tile selected by the user, the selection gesture used by the user to select the user interface tile, and/or other factors. Additionally, the type, size, shape, position, and other visual characteristics of the supplemental interface tile displayed on the user interface may be dependent on such criteria. For example, the location and/or size of the supplemental interface tile may be determined based on the particular selection gesture used by the user to select the associated interface tile. In this way, different supplemental information and/or user interactions may be displayed to the user in response to the user selecting the user interface tile using different, associated selection gestures.

It should be appreciated that user interface tile(s) displayed on the user interface of the mobile computing device 100 may be embodied as any type of application or notification icon, widget, or other user interface element that is selectable by a user to interact with an associated application, notification, or other software process. For example, the user interface tile may be embodied as an e-mail application icon, a social networking site application icon, a browser application icon, an operating system notification, a user communication notification, and/or other application and/or notification icons, widgets, or user interface elements. Additionally, the user interface tiles and associated supplemental interface tiles may have any type of geometric shape including, but not limited to, a rectangular shape, square shape, a circular shape, an elliptical shape, an irregular shape, or other geometric shape.

The mobile computing device 100 may be embodied as any type of mobile computing device capable of performing the functions described herein. For example, in some embodiments, the mobile computing device 100 may be embodied as a "smart" phone, a tablet computer, a mobile media device, and a game console, a mobile internet device (MID), a personal digital assistant, a laptop computer, a mobile appliance device, or other mobile computing device. As shown in FIG. 1, the illustrative mobile computing device 100 includes a processor 102, a memory 106, an input/output subsystem 108, and a display 110. Of course, the mobile computing device 100 may include other or additional components, such as those commonly found in a mobile computing device and/or communication device (e.g., various input/output devices), in other embodiments. Additionally, in some embodiments, one or more of the illustrative components may be incorporated in, or otherwise from a portion of, another component. For example, the memory 106, or portions thereof, may be incorporated in the processor 102 in some embodiments.

The processor 102 may be embodied as any type of processor capable of performing the functions described herein. For example, the processor may be embodied as a single or multi-core processor(s) having one or more processor cores 104, a digital signal processor, a microcontroller, or other processor or processing/controlling circuit. Similarly, the memory 106 may be embodied as any type of volatile or non-volatile memory or data storage currently known or developed in the future and capable of performing the functions described herein. In operation, the memory 106 may store various data and software used during operation of the mobile computing device 100 such as operating systems, applications, programs, libraries, and drivers. The memory 106 is communicatively coupled to the processor 102 via the I/O subsystem 108, which may be embodied as circuitry and/or components to facilitate input/output operations with the processor 102, the memory 106, and other components of the mobile computing device 100. For example, the I/O subsystem 108 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 108 may form a portion of a system-on-a-chip (SoC) and be incorporated, along with the processor 102, the memory 106, and other components of the mobile computing device 100, on a single integrated circuit chip.

The display 110 of the mobile computing device 100 may be embodied as any type of display on which information may be displayed to a user of the mobile computing device 100. For example, the display 110 may be embodied as, or otherwise use, any suitable display technology including, for example, a liquid crystal display (LCD), a light emitting diode (LED) display, a cathode ray tube (CRT) display, a plasma display, and/or other display usable in a mobile computing device. Additionally, in some embodiments, the display 110 may be embodied as a touchscreen display and include an associated touchscreen sensor (not shown) to receive tactile input and data entry from the user.

The mobile computing device 100 may also include a data storage 112. The data storage 112 may be embodied as any type of device or devices configured for the short-term or long-term storage of data such as, for example, memory devices and circuits, memory cards, hard disk drives, solid-state drives, or other data storage devices.

In some embodiments, the mobile computing device 100 may also include a communication circuit 114. The communication circuit 114 may be embodied as one or more devices and/or circuitry for enabling communications with one or more remote devices over a network. The communication circuit 114 may be configured to use any suitable communication protocol to communicate with remote devices over such network including, for example, cellular communication protocols, wireless data communication protocols, and/or wired data communication protocols.

Additionally, in some embodiments, the mobile computing device 100 may further include one or more peripheral devices 116. Such peripheral devices 116 may include any type of peripheral device commonly found in a mobile computing device such as speakers, a hardware keyboard, input/output devices, peripheral communication devices, antennas, and/or other peripheral devices.

Figure 2:
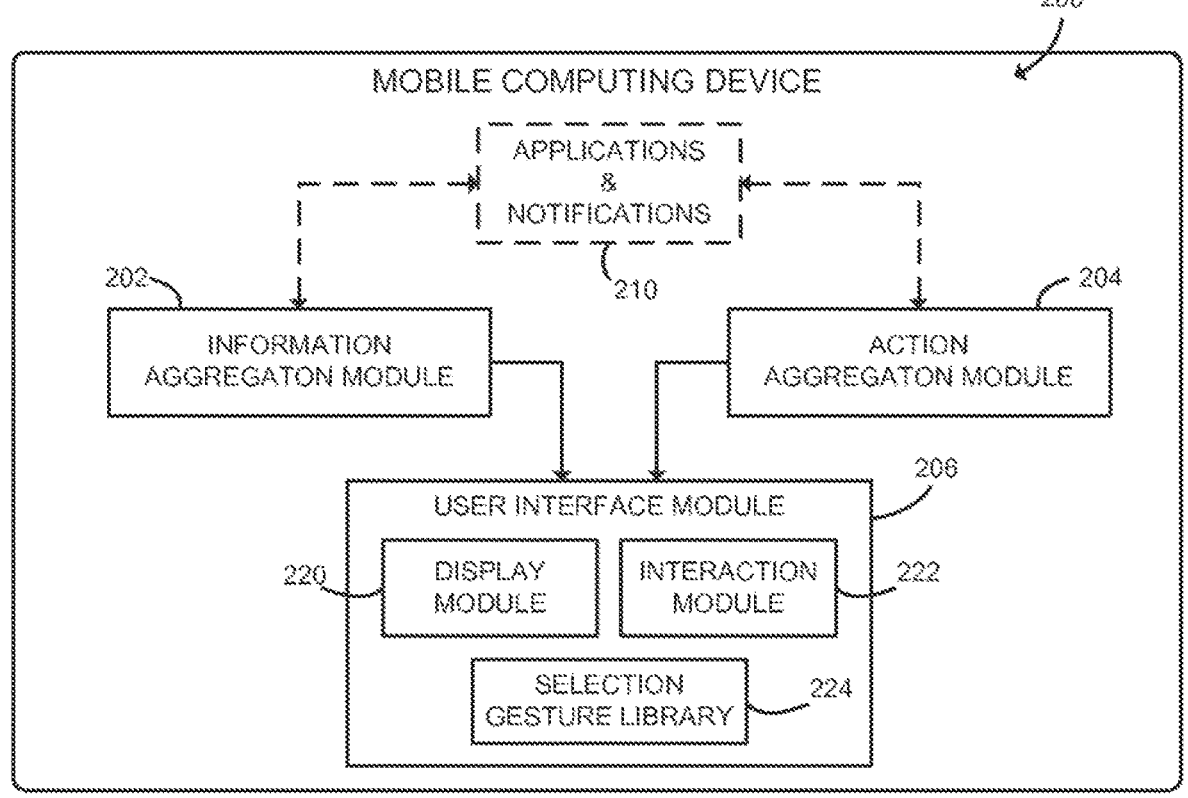
FIG. 2 is a simplified block diagram of at least one embodiment of an environment of the mobile computing device of FIG. 1.

Referring now to FIG. 2, in the illustrative embodiment, the mobile computing device 100 establishes an environment 200 during operation. The environment 200 includes an information aggregation module 202, an action aggregation module 204, and a user interface module 206, each of which may be embodied as software, firmware, hardware, or a combination thereof. Of course, in other embodiments, the environment 200 may include additional or other modules.

During use, the information aggregation module 202 interfaces with the applications and/or notifications 210 associated with user interface tiles displayed on the user interface of the mobile computing device 100 to determine any supplemental information that may be of use to the user. The information aggregation module 202 may utilize any suitable methodology to determine the associated supplemental information including, for example, interrogation of the applications and/or notifications 210, interception of alerts or messages generated by the applications and/or notifications 210, or other supplemental information discovery mechanism. Additionally or alternatively, each of the applications and/or notifications 210 may be configured (e.g., via an application program interface) to submit the supplemental information directly to the information aggregation module 202. The supplemental information may be embodied as any type of information related the user interface tile and/or the application/notification associated with the user interface tile. For example, the supplemental information may include a sub-set of information related to the activity that prompted the alert on the user interface tile (e.g., identification data related to a newly received e-mail or phone call). The determined supplemental information is provided to the user interface module 206 continually and/or in response to the user selecting the associated user interface tile as discussed in more detail below.

The action aggregation module 204 interfaces with the applications and/or notifications 210 associated with user interface tiles displayed on the user interface of the mobile computing device 100 to determine any related user actions that may be performed by the user. Similar to the information aggregation module 202, the action aggregation module 204 may utilize any of the methodologies discussed above to determine the available user interactions. Such user interactions may include any type of interaction with the user interface tile and/or the associated application/notification that is available to the user. For example, in regard to an e-mail user interaction tile, the user interactions may include "read mail," "respond," "delete," or other action that is typically available to the user when the associated e-mail application is fully opened. The determined user interactions are provided to the user interface module 206 continually and/or in response to the user selecting the associated user interface tile as discussed in more detail below.

The user interface module 206 illustratively includes a display module 220, an interaction module 222, and a selection gesture library 224. The user interface module 206 monitors the user's interaction with the user interface for selection of a user interface tile (e.g., an application icon). If the user selects a user interface tile, the user interface module 206 compares the selection gesture used by the user to select the user interface tile to the selection gesture library 224. If a match is found between the selection gesture and one of the pre-defined gestures stored in the selection gesture library 224, the display module 220 displays a supplemental tile on the user interface of the mobile computing device 100. Depending on the selection gesture used by the user to select the user interface tile, the display module 220 may display supplemental information and/or interaction widgets (e.g., user interface widgets such as buttons, controls, checkboxes, radio boxes, spinners, sliders, and/or other user interface widgets or elements) on the supplemental information tile. For example, in some embodiments, the selection gesture may be embodied as an information gesture to request supplemental information or an action gesture to request display of the available interaction widgets. Of course, any single supplemental interface tile may include both supplemental information and interaction widgets. Additionally, different supplemental information and/or interaction widgets may be displayed based on the user selecting the user interface tile using different selection gestures (e.g., a tap gesture may display a supplemental interface tile with supplemental information and a pull gesture may display a different supplemental interface tile with different supplemental information). Further, the user interface module 206 may determine the shape, size, type, and/or location of the supplemental interface tile based on the selection gesture used by the user (e.g. the location on the user interface at which the supplemental interface tile is displayed may be a function of the selection gesture used to select the associated user interface tile). If the displayed supplemental interface tile includes one or more interaction widget, the interaction module 222 is configured to perform one or more actions associated with the interaction widget in response to the user selecting the displayed interaction widget. For example, if the user selects a "delete e-mail" interaction widget, the interaction module 222 may interface with the associated e-mail application to cause deletion of the e-mail.

Figure 3:
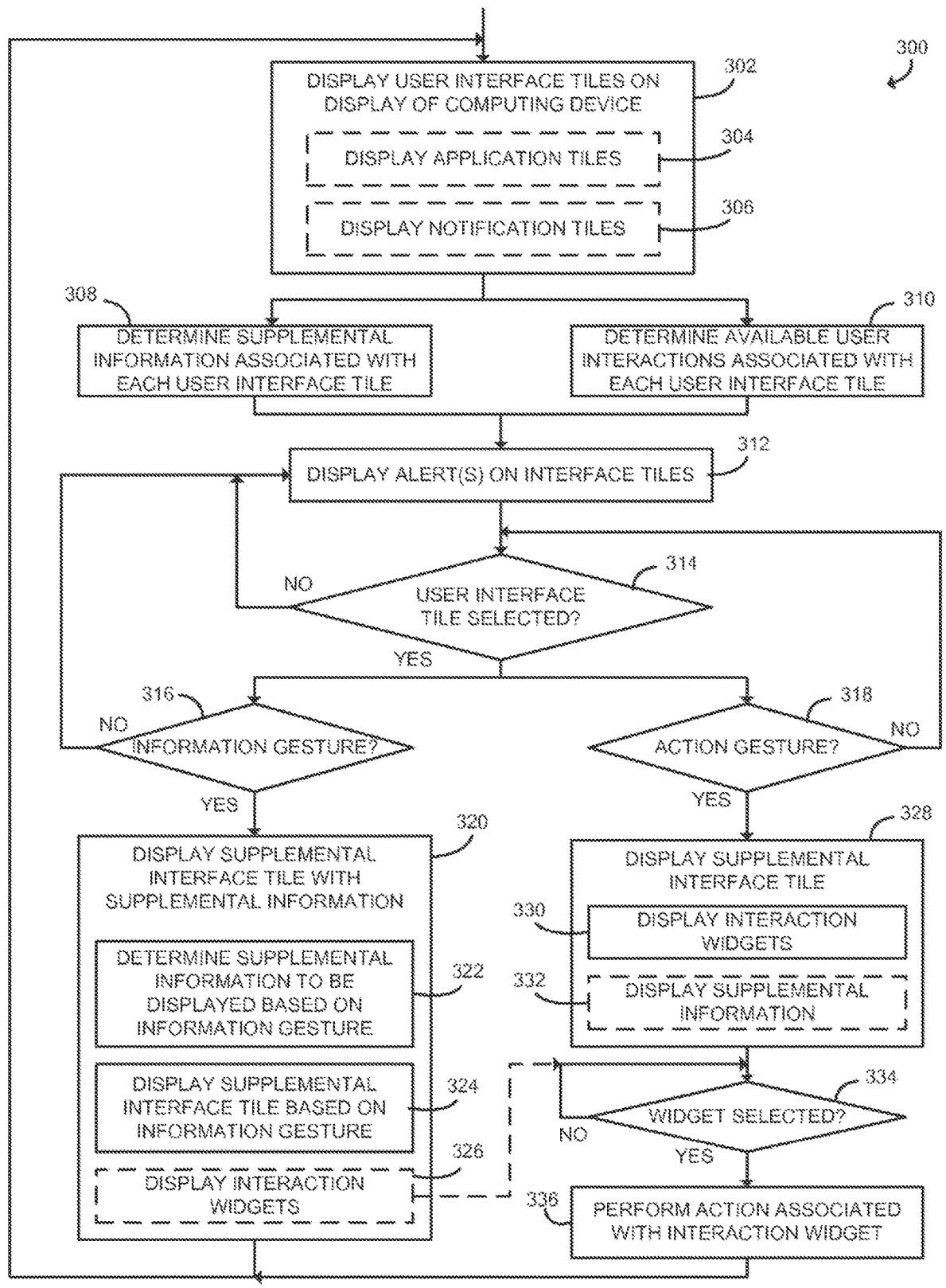
FIG. 3 is a simplified flow diagram of at least one embodiment of method for displaying supplemental interface tiles on a user interface of the mobile computing device of FIGS. 1 and 2.

Referring now to FIG. 3, in use, the mobile computing device 100 may execute a method 300 for displaying supplemental interface tiles on a user interface of the display 110 of the mobile computing device 100. The method 300 begins with bock 302 in which the mobile computing device 100 displays one or more user interface tiles on the user interface of the mobile computing device 100. Each of the user interface tiles may be associated with an application loaded on, or a notification stored on, the mobile computing device 100. As such, the mobile computing device 100 may display user interface application tiles (i.e., user interface tiles associated with applications loaded on the mobile computing device 100) in block 304 and/or display user interface notification tiles (i.e., user interface tiles associated with notifications generated by the mobile computing device 100) in block 306. As discussed above, each user interface tile may be embodied as any type of icon, widget, or other user interface element that is selectable by a user to interact with the associated application (e.g., e-mail application, social networking application, browser application, communication application, etc.) and/or notification (e.g., operating system notification, user communication notification, etc.). Additionally, each user interface tile may have any type of suitable geometric shape.

After the user interface tiles have been displayed on the user interface of the mobile computing device 100, the method 300 advances to blocks 308 and 310. In blocks 308 and 310, the mobile computing device 100 determines supplemental information and available user interactions, respectively, associated with each user interface tile. For example, in block 308, the information aggregation module 202 may interface with each user interface tile to determine any supplemental information that may be of use to the user of the mobile computing device. Similarly, in block 310, the action aggregation module 204 may interface with each user interface tile to determine the available user interactions that may be performed by the user. As discussed above, such interaction between the modules 202, 204 and the user interface tiles may include interrogation of the applications/notifications, interception of communications from the applications/notifications, communications received directly from the applications/notification, and/or other suitable discovery mechanisms. Although the blocks 308, 310 are shown in FIG. 3 as occurring in a particular location of the process flow of method 300, it should be appreciated that the blocks 308, 310 may be executed continually during execution of the method 300 such that additional supplemental information and user interactions are continually discovered and aggregated for existing and/or new user interface tiles.

In block 312, the mobile computing device 100 determines whether any application or notification alerts have been generated and, if so, displays an alert icon on the user interface tile associated with the application/notification that generated the alert. Such alerts may be generated in response to any event associated with the underlying application/notification. For example, if a new e-mail or text message is received, an alert icon (e.g., the number of unread e-mails or messages) may be displayed on top of the user interface tile associated with the e-mail or test message application. The alert may be embodied as any type of visual, audible, or tactile alert capable of notifying the user that an alert event has occurred. For example, in some embodiments, a vibration alert may be used to signal receipt of a new e-mail instead of, or in addition to, a visual alert. In some embodiments, the generating of an alert on one of the user interface tiles prompts the execution of blocks 308 and 310 (which may be continually executed in the background). That is, the information aggregation module 202 and the action aggregation module 204 may interface with the application/notification associated with the user interface tile that has been updated with the alert to determine any new supplemental information and/or user interactions. That is, such interfacing may be in response to the generation of the alert and, in some embodiments, the application/notification that generated the alert may be configured to supply the new supplemental information and/or user interactions to the information aggregation module 202 and/or action aggregation module 204 as discussed above.

In block 312, the method 300 advances to block 314 in which the mobile computing device 100 determines whether the user has selected one of the user interface tiles. If not, the method 300 loops back to block 312 in which the mobile computing device 100 continues to monitor for the generation of an alert event and/or selection of a user interface tile in block 314. However, if the user has selected a user interface tile, the method 300 advances to blocks 316 and 318.

In block 316, the mobile computing device 100 determines whether the selection gesture used by the user to select the user interface tile was a supplemental information gesture (e.g., a pre-defined gesture used to request additional supplemental information). To do so, the user interface module 206 compares the selection gesture used by the user to one or more pre-defined supplemental information gestures stored in the selection gesture library 224. In this way, the user interface module 206 determines whether the selection gesture matches one of the pre-defined supplemental information gestures. Each pre-defined supplemental information gesture may be embodied as any type of gesture usable to select a user interface tile. For example, in embodiments in which the display 110 is embodied as a touchscreen display, the pre-defined supplemental information gestures may include, but are not limited to, a tap gesture, a double tap gesture, a long tap gesture, a pull gesture, a slide gesture, a circle gesture, a motion gesture, or other gesture. Additionally, each pre-defined supplemental information gesture may be applicable to multiple user interface tiles to display similar or different supplemental information associated with each user interface tile (and/or the application/notification associated with the user interface tile).

If the user interface module 206 determines that the selection gesture does not match any of the pre-defined supplemental information gestures, the method 300 loops back to block 312 in which the mobile computing device 100 displays any newly generated alerts. However, if a match is found between the selection gesture and one of the pre-defined supplemental information gestures stored in the selection gesture library 224, the method 300 advances to block 320. In block 320 the display module 220 of the user interface module 206 displays a supplemental interface tile on the user interface of the mobile computing device 100. As discussed above, the location, size, type, shape, and/or other visual characteristic of the supplemental interface tile may be based on the selected interface tile and/or the selection gesture used to select the interface tile.

The display module 220 also displays any associated supplemental information on the supplemental tile in block 320. To do so, the user interface module 206 determines the supplemental information to be displayed based on the selection gesture used to select the user interface tile (i.e., based on the matched pre-defined supplemental information gesture) in block 322 and displays the determined supplemental information on the supplemental tile in block 324 (i.e., the supplemental information determined in block 308). In this way, the user may review different supplemental information by utilizing a different selection gesture to select the associated user interface tile. For example, the user may select a user interface tile associated with an e-mail application using a "long tap" selection gesture to display the most recent e-mail sender and may select the same user interface tile using a "pull" selection gesture to display the last sent e-mail or other information.

In some embodiments, one or more user interactions associated with the supplemental information may be available to the user. In such embodiments, one or more interaction widgets may be also be displayed, in block 326, on the supplemental interface tile in association with the supplemental information. The interaction widgets may be embodied as any type of user interface widget including, but not limited to, a button, control, check box, data field, or other interface interaction icon or element. If an interaction widget is associated with the supplemental information and displayed on the supplemental interface tile in block 326, the method 300 advances to block 334 in which the interaction module 222 determines whether the user has selected one of the displayed interaction widgets. If not, the method 300 loops back to block 334 to continue to monitor for user interaction (including the closing of the supplemental interface tile). However, if the user has selected one of the displayed interaction widgets, the method 300 advances to block 336 in which the interaction module 222 performs one or more actions associated with the selected interaction widget. Such actions may be embodied as any action performable by the application/notification associated with the selected user interface tile. The interaction module 222 may perform the action directly or may interface with the associated application/notification to request that the selected action be performed. In this way, the user may perform functions or actions of the associated application/notification without opening the associated application/notification or otherwise switching the user's current context.

If no interaction widgets are displayed on the supplemental interface tile in block 326 or after the associated action of a selected interaction widget is performed in block 336, the method 300 loops back to block 302 in which the mobile computing device 100 continues to display user interface tiles on the user interface. Additionally, the mobile computing device 100 continues to aggregate available supplemental information and user interactions for each displayed user interface tile in blocks 308, 310 as discussed above.

Referring back to block 318, if the mobile computing device 100 determines that the user has selected a user interface tile in block 314, the mobile computing device 100 also determines whether the selection gesture used by the user to select the user interface tile was an action gesture (e.g., a pre-defined gesture used to request the display of available user interactions or controls). To do so, the user interface module 206 compares the selection gesture used by the user to one or more pre-defined action gestures stored in the selection gesture library 224. In this way, the user interface module 206 determines whether the selection gesture matches one of the pre-defined action gestures. As with the pre-defined supplemental information gestures described above, the pre-defined action gesture may be embodied as any type of gesture usable to select a user interface tile including, but not limited to a tap gesture, a double tap gesture, a long tap gesture, a pull gesture, a slide gesture, a circle gesture, a motion gesture, or other gesture. Additionally, each pre-defined action gesture may be applicable to multiple user interface tiles to display similar or different available actions associated with each user interface tile (and/or the application/notification associated with the user interface tile).

If the user interface module 206 determines that the selection gesture does not match any of the pre-defined action gestures, the method 300 loops back to block 312 in which the mobile computing device 100 displays any newly generated alerts. However, if a match is found between the selection gesture and one of the pre-defined action gestures stored in the selection gesture library 224, the method 300 advances to block 328. In block 328 the display module 220 of the user interface module 206 displays a supplemental interface tile on the user interface of the mobile computing device 100. As discussed above, the location, size, type, shape, and/or other visual characteristic of the supplemental interface tile may be based on the selected interface tile and/or the selection gesture used to select the interface tile.

The display module 220 also displays an interaction widget on the supplemental interface tile for each user interaction available to the user in block 330. As discussed above, each interaction widget may be embodied as any type of user interface widget including, but not limited to, a button, control, check box, data field, or other interface interaction icon or element. Additionally, in some embodiments, supplemental information associated with the available user interactions and/or the selected user interface tile may be displayed on the supplemental interface tile in block 332. To do so, the user interface module 206 may execute the blocks 322 and 324, discussed above, to determine and display the supplemental information. As such, it should be appreciated that a single selection gesture may be embodied as a supplemental information gesture, an action gesture, or a combination of a supplemental information gesture and an action gesture (i.e., both supplemental information and interaction widgets may be displayed on the supplemental interface tile).

After the supplemental interface tile and any associated interaction widgets have been displayed in block 328, the method advances to block 334. In block 334, the interaction module 222 determines whether the user has selected one of the displayed interaction widgets. If not, the method 300 loops back to block 334 to continue to monitor for user interaction (including the closing of the supplemental interface tile). However, if the user has selected one of the displayed interaction widgets, the method 300 advances to block 336 in which the interaction module 222 performs one or more actions associated with the selected interaction widget. As discussed above, such actions may be embodied as any action performable by the application/notification associated with the selected user interface tile. The interaction module 222 may perform the action directly or may interface with the associated application/notification to request that the selected action be performed. After the selected action has been performed, the method 300 loops back to block 302 in which the mobile computing device 100 continues to display user interface tiles on the user interface.

Figure 6:
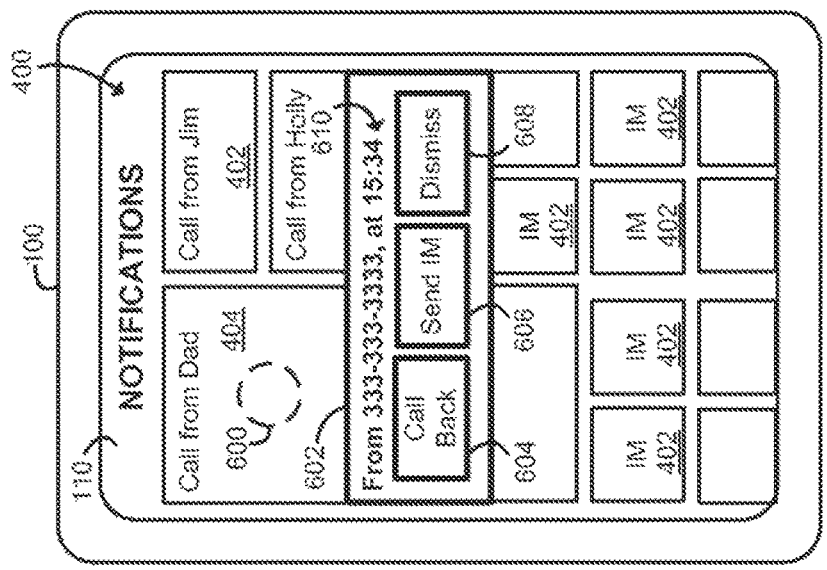
FIG. 6 is a simplified illustration of at least one embodiment of another supplemental interface tile displayed on the mobile computing device of FIGS. 1 and 2 in association with a user interface notification tile of the notification user interface of FIG. 4.
Figure 5:
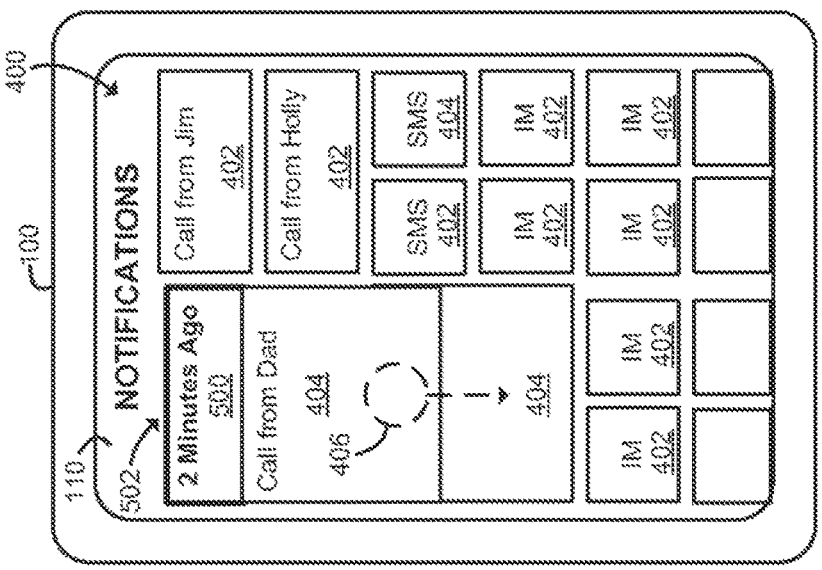
FIG. 5 is a simplified illustration of at least one embodiment of a supplemental interface tile displayed on the mobile computing device of FIGS. 1 and 2 in association with a user interface notification tile of the notification user interface of FIG. 4.
Figure 4:
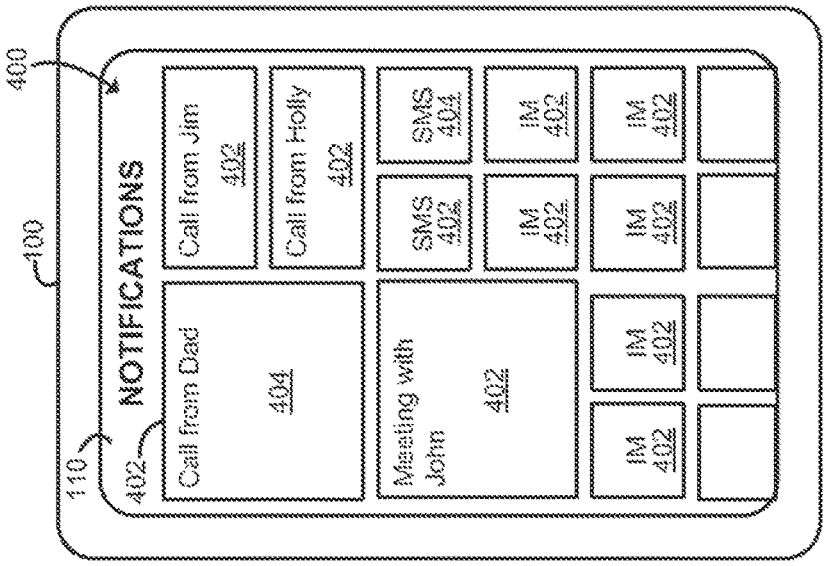
FIG. 4 is a simplified illustration of at least one embodiment of notification user interface having multiple user interface notification tiles displayed on the mobile computing device of FIGS. 1 and 2.

Referring now to FIGS. 4-6, an illustrative user interface 400 is shown displayed on the display 110 of the mobile computing device 100. As shown in FIG. 4, the user interface 400 is embodied as a notification interface and includes multiple user interface tiles 402 embodied as notification user interface tiles. Each notification user interface tile 402 may have a different shape, color, size, position, or other visual characteristic different from other notification user interface tiles 402. Each notification user interface tile 402 provides a notification of an alert event associated with a related application. For example, notification user interface tile 404 provides notification that a call from "Dad" has been received. The user may select the notification user interface tile 404 to open the associated communication application to review the call details and return the call as with a typical user interface.

Alternatively, as shown in FIG. 5, the user may select the notification user interface tile 404 using a supplemental information selection gesture 406 to cause the display of a supplemental interface tile 500 to be displayed on the user interface 400. In the illustrative embodiment of FIG. 5, the selection gesture matches a pre-defined supplemental information gesture 406, which causes supplemental information 502 to be displayed on the supplemental interface tile 500. In illustrative supplemental information 502 notifies the user of the relative time at which the call was received.

Additionally or alternatively, the user may select the notification user interface tile 404 using an action gesture 600 to cause the display of a supplemental interface tile 602 to be displayed on the user interface 400 as shown in FIG. 6. In the illustrative embodiment of FIG. 6, the selection gesture matches a pre-defined action gesture 600, which causes several interaction widgets 604, 606, 608, illustratively embodied as buttons, to be displayed on the supplemental interface tile 602. Additionally, in the illustrative embodiment, supplemental information 610 is also displayed on the supplemental interface tile 602 that identifies the telephone number of the received call and the time at which the call was received. The user may select any one of the interaction widgets 604, 606, 608 to cause the associated action to be performed by the mobile computing device 100. For example, the user may select the interaction widget 604 to call back the telephone number of the received call, select the interaction widget 606 to send a text message to the telephone number, or select the interaction widget 608 to dismiss the associated notification (i.e., delete the user interface tile 402 from the user interface 400).

It should be appreciated, of course, that other selection gestures may be used by the user to select the user interface tile 402 to cause other supplemental interface tiles to be displayed on the user interface. For example, additional or other supplemental information and/or interaction widgets may be displayed or accessible by utilizing other selection gestures. Additionally, as discussed above, the type, size, shape, location, color, and other visual characteristics of the displayed supplemental interface tile may vary based on the selection gesture used to select the associated user interface tile, the selected user interface tile (e.g., the location of the selected interface tile), and/or the application/notification associated with the selected user interface tile. Further, as discussed above, each supplemental interface tile may be embodied as a supplemental information interface tile, a user interaction supplemental interface tile, or a combination thereof. For example, in the illustrative embodiment of FIG. 6, the supplemental interface tile 602 illustrates an embodiment of a combined supplemental information and user interaction supplemental interface tile.

Figure 8:
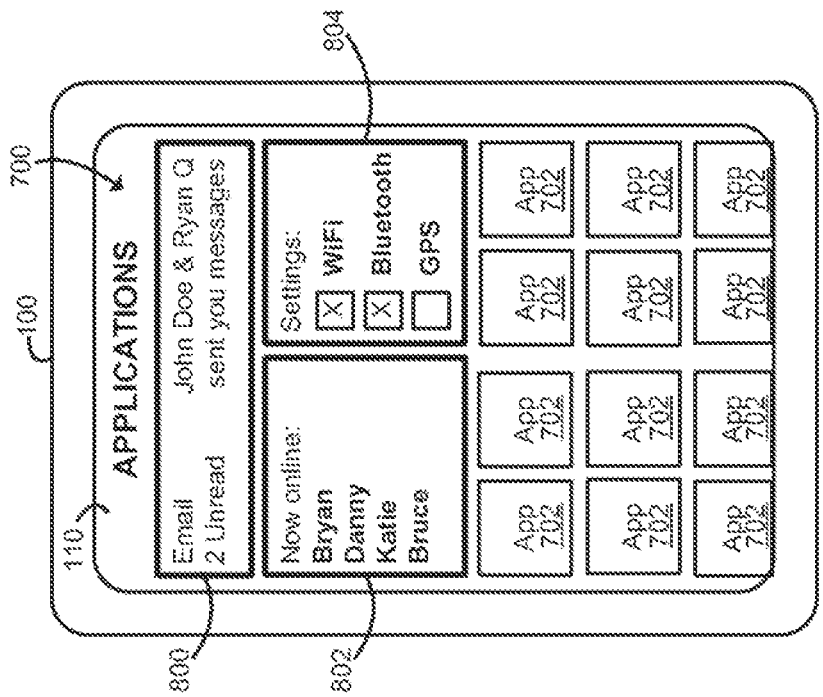
FIG. 8 is a simplified illustration of at least one embodiment of supplemental interface tiles displayed on the mobile computing device of FIGS. 1 and 2 in association with an application user interface tile of the application user interface of FIG. 7.
Figure 7:
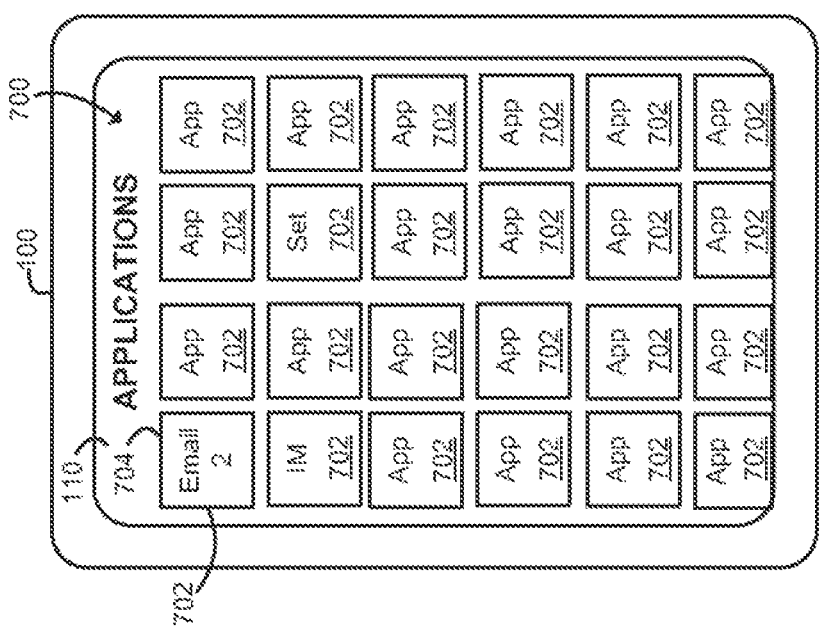
FIG. 7 is a simplified illustration of at least one embodiment of an application user interface having multiple application user interface tiles displayed on the mobile computing device of FIGS. 1 and 2.

Referring now to FIGS. 7 and 8, an illustrative user interface 700 is shown displayed on the display 110 of the mobile computing device 100. As shown in FIG. 7, the user interface 700 is embodied as an application interface and includes multiple user interface tiles 702 embodied as application user interface tiles. Each application user interface tile 702 may have a different shape, color, size, position, or other visual characteristic different from other application user interface tiles 702. Each application user interface tile 702 provides a "quick launch" for the associated application. For example, the user may select an e-mail application user interface tile 704 to open an associated e-mail application, typically in full screen mode.

Alternatively, as shown in FIG. 8, the user may select the e-mail application user interface tile 704 using a pre-defined selection gesture to cause the display of a supplemental interface tile 800 to be displayed on the user interface 700. In the illustrative embodiment of FIG. 8, the supplemental interface tile 800 notifies the user that two unread e-mails have been received and identifies the sender of those e-mails. Additionally, in the illustrative embodiment, another supplemental interface tile 802 is displayed that identifies those friends of the user that are currently online. A further supplemental interface tile 804 is also displayed which includes several "Settings" widgets that the user may select to change the mode of wireless communication of the mobile computing device 100. In some embodiments, each of the supplemental interface tiles 800, 802, 804 may be displayed in response to a separate selection gesture (e.g., a pre-defined information gesture or a pre-defined action gesture). Alternatively, two or more of the supplemental interface tiles 800, 802, 804 may be displayed contemporaneously in response to a single selection gesture.

It should be appreciated that the disclosed technologies allow the user of the mobile computing device 100 to obtain supplemental information and perform actions associated with the selected user interface tile and/or the application/notification associated therewith. As such, the user may quickly review the related information and interact with the associated application/notification without the requirement of fully opening or otherwise engaging the associated application/notification.

EXAMPLES

Illustrative examples of the devices, systems, and methods disclosed herein are provided below. An embodiment of the devices, systems, and methods may include any one or more, and any combination of, the examples described below.

Example 1 includes a mobile computing device for displaying supplemental interface tiles on a user interface of the mobile computing device. The mobile computing device includes an aggregation module to determine at least one of (i) supplemental information associated with a user interface tile displayed on the user interface and (ii) available user interactions associated with the user interface tile; and a user interface module to (i) display a supplemental interface tile in association with the user interface tile in response to a user of the computing device selecting the user interface tile, (ii) determine a selection gesture used by the user to select the user interface tile, and (ii) display at least one of the supplemental information on the supplemental interface tile in response to the selection gesture matching a pre-defined information gesture and, at least one interaction widget on the supplemental interface tile in response to the selection gesture matching a pre-defined action gesture.

Example 2 includes the subject matter of Example 1, and wherein the aggregation module comprises an information aggregation module to determine supplemental information to be displayed on the supplemental interface tile as a function of the selection gesture.

Example 3 includes the subject matter of any of Examples 1 and 2, and wherein the aggregation module comprises an action aggregation module to determine available user interactions to be displayed on the supplemental interface tile as a function of the selection gesture.

Example 4 includes the subject matter of any of Examples 1-3, and wherein the user interface module comprises a user interface module to display the supplemental interface tile in a position on the user interface as a function of the selected interface tile and the selection gesture.

Example 5 includes the subject matter of any of Examples 1-4, and wherein the user interface module is to display a first supplemental interface tile in a first location on the user interface in response to the selection gesture matching a first pre-defined information gesture; and display a second supplemental interface tile in a second location on the user interface different from the first location in response to the selection gesture matching a second pre-defined information gesture.

Example 6 includes the subject matter of any of Examples 1-5, and wherein the user interface module is to display first supplemental information on the first supplemental interface tile in response to the selection gesture matching the first pre-defined information gesture; and display second supplemental information different from the first supplemental information on the second supplemental interface tile in response to the selection gesture matching the second pre-defined information gesture.

Example 7 includes the subject matter of any of Examples 1-6, and wherein the user interface module is to display a first interaction widget on the first supplemental interface tile in response to the selection gesture matching the first pre-defined information gesture; and display a second interaction widget different from the first interaction widget on the second supplemental interface tile in response to the selection gesture matching the second pre-defined information gesture.

Example 8 includes the subject matter of any of Examples 1-7, and wherein the user interface module is to display a first supplemental interface tile in a first location on the user interface in response to the selection gesture matching a first pre-defined action gesture; and display a second supplemental interface tile in a second location on the user interface different from the first location in response to the selection gesture matching a second pre-defined action gesture.

Example 9 includes the subject matter of any of Examples 1-8, and wherein the user interface module is to displaying a first interaction widget on the first supplemental interface tile in response to the selection gesture matching the first pre-defined action gesture; and displaying a second interaction widget different from the first interaction widget on the second supplemental interface tile in response to the selection gesture matching the second pre-defined action gesture.

Example 10 includes the subject matter of any of Examples 1-9, and wherein the user interface module is to display first supplemental information on the first supplemental interface tile in response to the selection gesture matching the first pre-defined action gesture; and display second supplemental information different from the first supplemental information on the second supplemental interface tile in response to the selection gesture matching the second pre-defined action gesture.

Example 11 includes the subject matter of any of Examples 1-10, and wherein the user interface module is to display a first supplemental interface tile in a first location on the user interface in response to the selection gesture matching a pre-defined information gesture; and display a second supplemental interface tile, different from the first supplemental interface tile, in a second location on the user interface different from the first location in response to the selection gesture matching a pre-defined action gesture.

Example 12 includes the subject matter of any of Examples 1-11, and wherein the user interface tile comprises a notification tile.

Example 13 includes the subject matter of any of Examples 1-12, and wherein the user interface tile comprises an application tile.

Example 14 includes the subject matter of any of Examples 1-13, and wherein the at least one interaction widget comprises a user interface widget selectable by the user to cause the computing device to perform an associated action.

Example 15 includes the subject matter of any of Examples 1-14, and wherein the user interface widget comprises at least one of: an action button, a checkbox, a radio box, a spinner, and a slider.

Example 16 includes the subject matter of any of Examples 1-15, and wherein the user interface module is further to cause performance of the associated action on the computing device in response to the user's selection of the user interface widget.

Example 17 includes the subject matter of any of Examples 1-16, and wherein the user interface module is further to determine at least one of a tile type, a tile size, a tile shape, and a tile location of the supplemental interface tile.

Example 18 includes the subject matter of any of Examples 1-17, and wherein the user interface module is further to display an alert on the user interface tile in response to determination that supplemental information or user interactions associated with the user interface tile are available.

Example 19 includes the subject matter of any of Examples 1-18, and wherein the alert identifies the number of supplemental information or user interactions that are available.

Example 20 includes a method for displaying supplemental interface tiles on a user interface of a computing device. The method includes determining at least one of (i) supplemental information associated with a user interface tile displayed on the user interface and (ii) available user interactions associated with the user interface tile; displaying a supplemental interface tile in association with the user interface tile in response to a user of the computing device selecting the user interface tile; determining a selection gesture used by the user to select the user interface tile; and displaying (i) the supplemental information on the supplemental interface tile in response to the selection gesture matching a pre-defined information gesture and (ii) at least one interaction widget on the supplemental interface tile in response to the selection gesture matching a pre-defined action gesture.

Example 21 includes the subject matter of Example 20, and wherein determining supplemental information comprises determining supplemental information to be displayed on the supplemental interface tile as a function of the selection gesture.

Example 22 includes the subject matter of any of Examples 20 and 21, and wherein displaying the supplemental interface tile comprises displaying the supplemental interface tile in a position on the user interface as a function of the selected interface tile and the selection gesture.

Example 23 includes the subject matter of any of Examples 20-22, and wherein displaying a supplemental interface tile comprises displaying a first supplemental interface tile in a first location on the user interface in response to the selection gesture matching a first pre-defined information gesture; and displaying a second supplemental interface tile in a second location on the user interface different from the first location in response to the selection gesture matching a second pre-defined information gesture.

Example 24 includes the subject matter of any of Examples 20-23, and wherein displaying the supplemental information comprises displaying first supplemental information on the first supplemental interface tile in response to the selection gesture matching the first pre-defined information gesture; and displaying second supplemental information different from the first supplemental information on the second supplemental interface tile in response to the selection gesture matching the second pre-defined information gesture.

Example 25 includes the subject matter of any of Examples 20-24, and further including displaying a first interaction widget on the first supplemental interface tile in response to the selection gesture matching the first pre-defined information gesture; and displaying a second interaction widget different from the first interaction widget on the second supplemental interface tile in response to the selection gesture matching the second pre-defined information gesture.

Example 26 includes the subject matter of any of Examples 20-25, and wherein displaying a supplemental interface tile comprises displaying a first supplemental interface tile in a first location on the user interface in response to the selection gesture matching a first pre-defined action gesture; and displaying a second supplemental interface tile in a second location on the user interface different from the first location in response to the selection gesture matching a second pre-defined action gesture.

Example 27 includes the subject matter of any of Examples 20-26, and wherein displaying the at least one interaction widget comprises displaying a first interaction widget on the first supplemental interface tile in response to the selection gesture matching the first pre-defined action gesture; and displaying a second interaction widget different from the first interaction widget on the second supplemental interface tile in response to the selection gesture matching the second pre-defined action gesture.

Example 28 includes the subject matter of any of Examples 20-27, and further including displaying first supplemental information on the first supplemental interface tile in response to the selection gesture matching the first pre-defined action gesture; and displaying second supplemental information different from the first supplemental information on the second supplemental interface tile in response to the selection gesture matching the second pre-defined action gesture.

Example 29 includes the subject matter of any of Examples 20-28, and wherein displaying a supplemental interface tile comprises displaying a first supplemental interface tile in a first location on the user interface in response to the selection gesture matching a pre-defined information gesture; and displaying a second supplemental interface tile, different from the first supplemental interface tile, in a second location on the user interface different from the first location in response to the selection gesture matching a pre-defined action gesture.

Example 30 includes the subject matter of any of Examples 20-29, and wherein determining at least one of supplemental information and available user interactions comprises determining at least one of (i) supplemental information associated with a notification tile displayed on the user interface and (ii) available user interactions associated with the notification tile.

Example 31 includes the subject matter of any of Examples 20-30, and wherein determining at least one of supplemental information and available user interactions comprises determining at least one of (i) supplemental information associated with an application tile displayed on the user interface and (ii) available user interactions associated with the application tile.

Example 32 includes the subject matter of any of Examples 20-31, and wherein displaying at least one interaction widget on the supplemental interface tile comprises displaying a user interface widget on the supplemental interface tile that is selectable by the user to cause the computing device to perform an associated action.

Example 33 includes the subject matter of any of Examples 20-32, and further including performing the associated action on the computing device in response to the user's selection of the user interface widget.

Example 34 includes the subject matter of any of Examples 20-33, and wherein displaying the supplemental interface tile comprises determining at least one of a tile type, a tile size, a tile shape, and a tile location as a function of the selection gesture.

Example 35 includes the subject matter of any of Examples 20-34, and further including displaying an alert on the user interface tile in response to determining that supplemental information or user interactions associated with the user interface tile are available.

Example 36 includes the subject matter of any of Examples 20-35, and wherein the alert identifies the number of supplemental information or user interactions that are available.

Example 37 includes a computing device comprising a processor; and a memory having stored therein a plurality of instructions that when executed by the processor cause the computing device to perform the method of any of Examples 20-36.

Example 38 includes one or more machine readable storage media comprising a plurality of instructions stored thereon that in response to being executed result in a computing device performing the method of any of Examples 20-36.

The invention claimed is:

1. An electronic device comprising:
a screen to display a user interface;
communication circuitry;
memory circuitry; and
at least one processor circuitry to:
cause display, on the user interface, of a message tile associated with a message application, the message tile to display an identification of a sender of a message and an indication of receipt of the message at the electronic device;
cause display, after a first tap gesture on the message tile, of a first supplemental information tile on the user interface, the first supplemental information tile including the message and a first control;
cause display, after a second tap gesture on the first control, of a second supplemental information tile including a second control; and
cause, after a swipe gesture on at least one of the message tile, the first supplemental information tile, or the second supplemental information tile, clearing of the corresponding at least one of the message tile, the first supplemental information tile, or the second supplemental information tile from the user interface.

2. The electronic device of claim 1, wherein one or more of the at least one processor circuitry is to display a user interface tile including a third control, the third control selectable to change a mode of communication of the communication circuitry.

3. The electronic device of claim 2, wherein the mode of communication includes at least one of cellular communication or wireless data communication.

4. The electronic device of claim 1, wherein one or more of the at least one processor circuitry is to cause display of the first supplemental information tile in place of the message tile on the user interface.

5. The electronic device of claim 1, wherein the electronic device is a phone, and wherein the message includes at least one of a text message or an electronic mail message.

6. The electronic device of claim 1, wherein activation of at least one of the first control or the second control causes adjustment of at least one of a size, a shape, or a time associated with the message tile.

7. The electronic device of claim 1, wherein at least one of the first control or the second control includes at least one of a reply control, a delete control, or a dismiss control.

8. The electronic device of claim 1, wherein the second control is not displayed on the first supplemental information tile.

9. At least one storage device comprising instructions to cause at least one processor circuit to at least:
cause display, on a user interface, of a message tile associated with a message application, the message tile to display an identification of a sender of a message and an indication of receipt of the message;
cause display, after a first tap gesture on the message tile, of a first supplemental information tile on the user interface, the first supplemental information tile including the message and a first control;
cause display, after a second tap gesture on the first control, of a second supplemental information tile including a second control; and
cause, after a swipe gesture on at least one of the message tile, the first supplemental information tile, or the second supplemental information tile, dismissing of the corresponding at least one of the message tile, the first supplemental information tile, or the second supplemental information tile from the user interface.

10. The at least one storage device of claim 9, wherein the instructions cause one or more of the at least one processor circuit to cause display a user interface tile including a third control, the third control selectable to change a mode of communication.

11. The at least one storage device of claim 9, wherein the instructions cause one or more of the at least one processor circuit to display the first supplemental information tile in place of the message tile on the user interface.

12. The at least one storage device of claim 9, wherein the message includes at least one of a text message or an electronic mail message.

13. The at least one storage device of claim 9, wherein activation of at least one of the first control or the second control causes adjustment of at least one of a size, a shape, or a time associated with the message tile.

14. The at least one storage device of claim 9, wherein at least one of the first control or the second control includes at least one of a reply control, a delete control, or a dismiss control.

15. An apparatus comprising:
at least one processor circuit;
memory circuitry; and
instructions to cause one or more of the at least one processor circuit to:
cause display, on a user interface, of a message tile associated with a message application, the message tile to identify a sender of a message and an indication of receipt of the message;
cause display, after a first supplemental information gesture on the message tile, of first supplemental information on the user interface, the first supplemental information including the message and a first control;
cause display, after a second supplemental information gesture on the first control, of second supplemental information including a second control; and
cause, after a third supplemental information gesture on at least one of the message tile, the first supplemental information, or the second supplemental information, dismissing of the corresponding at least one of the message tile, the first supplemental information, or the second supplemental information from the user interface.

16. The apparatus of claim 15, wherein the first supplemental information gesture includes a first tap gesture, the second supplemental information gesture includes a second tap gesture, and the third supplemental information gesture includes a swipe gesture.

17. The apparatus of claim 15, wherein the instructions cause one or more of the at least one processor circuit to display a user interface tile including a third control, the third control selectable to change a mode of communication.

18. The apparatus of claim 15, wherein the instructions cause one or more of the at least one processor circuit to cause display the first supplemental information in place of the message tile on the user interface.

19. The apparatus of claim 15, wherein the message includes at least one of a text message or an electronic mail message.

20. The apparatus of claim 15, wherein at least one of the first control or the second control includes at least one of a reply control, a delete control, a dismiss control, a size control, a shape control, or a time control.

* * * * *